United States Patent [19]

Giakos

[11] Patent Number: 6,069,362

[45] Date of Patent: May 30, 2000

[54] MULTI-DENSITY AND MULTI-ATOMIC NUMBER DETECTOR MEDIA FOR APPLICATIONS

[75] Inventor: George C. Giakos, Fairlawn, Ohio

[73] Assignee: The University of Akron, Akron, Ohio

[21] Appl. No.: 09/078,991

[22] Filed: May 14, 1998

[51] Int. Cl.⁷ .................................................. G01T 1/24
[52] U.S. Cl. ..................... 250/394; 250/385.1; 250/374; 250/370.01; 250/324; 250/363.02
[58] Field of Search ............................. 250/394, 385.1, 250/374, 370.01, 324, 363.02

[56] References Cited

U.S. PATENT DOCUMENTS

| | | | |
|---|---|---|---|
| 4,707,608 | 11/1987 | DiBianca | 250/385.1 |
| 4,780,897 | 10/1988 | McDaniel | 250/385.1 |
| 5,451,793 | 9/1995 | Boone | 250/363.02 |
| 5,500,534 | 3/1996 | Robinson et al. | |
| 5,677,539 | 10/1997 | Apotovsky et al. | 250/370.01 |

FOREIGN PATENT DOCUMENTS 405121036  5/1993  Japan .

*Primary Examiner*—Constantine Hannaher
*Assistant Examiner*—Andrew Israel
*Attorney, Agent, or Firm*—Renner, Kenner, Greive, Bobak, Taylor & Weber

[57] ABSTRACT

A multi-detector system receives incident radiation through a subject includes a gaseous microstrip detector, which has alternating anodes and cathodes on a substrate opposite a voltage source, is positioned adjacent a semiconductor detector. In a dual energy environment, electric fields are applied to both detectors as the incident radiation is directed therethrough. Accordingly, the detectors generate corresponding signals which are compared to generate a contrasted signal of the subject. These signals may be generated for imaging, radiation monitoring, radiation measuring and the like. The direction of incident radiation and the orientation of the electric fields may be adjusted according to the particular application. Additionally, the system can be utilized in a single-energy environment where two images of the same incident radiation energy will be formed from the different detector media. By utilizing various processing techniques enhanced contrast between the images can be obtained.

20 Claims, 3 Drawing Sheets

MULTI-DENSITY AND MULTI-ATOMIC NUMBER DETECTOR MEDIA FOR APPLICATIONS

TECHNICAL FIELD

The present invention is directed to x-ray digital radiography, including single energy and dual-energy imaging, computed tomography (CT), microtomography and x-ray microscopy; nuclear medicine, including quantitative autoradiography, single photon emission tomography (SPECT) and positron emission tomography (PET); any medical detector technology involving monitoring, measuring, recording or projection of ionizing radiation of any energy range; bio-optical imaging, including optical confocal microscopy and optical tomography; and industrial applications, such as aerospace imaging and security surveillance systems. The invention is more particularly directed to multi-density and multi-atomic number detector media implemented, if needed, by kinestasis or time-delay integration for use in the above applications.

BACKGROUND ART

The capture and detection of ionizing radiation in an efficient way, without significant loss or degradation of the image information, is of paramount significance in medical imaging. Recent advances in medical detector technology make it possible for superior images to be produced by digital electronic techniques, such as digital radiography, as opposed to classical film-screen techniques. In fact, new methods of radiographic imaging that utilize advances in electronics and computer technology have been shown to improve diagnostic quality and allow for new diagnostic modalities with reduced patient dose. Specifically, digital radiography has many advantages over conventional radiography such as expanded display of detector dynamic range, fast image acquisition and display, convenient storage, transmission and display of stored images without degradation, extended capabilities of data analysis and image processing, and reduced patient dose.

Different detector technologies and beam geometries have been proposed for digital radiography, such as scintillator-photodiode systems, high-pressure gas filled detectors, scintillator-photomultiplier systems, kinestatic charge detectors, proximity image intensifier/CCD devices, phosphor screen-photodiode systems and diode arrays.

Some of the disadvantages of known digital radiographic systems is the relatively high initial cost and the limited detector resolution. The efficient detection of X-ray radiation is the main problem in digital radiography, computed tomography, and affiliated disciplines. Recent advances in medical detector technology suggests that superior radiation images may be produced by means of digital electronic techniques. In particular, recent advances in electronics and computer technology have provided improved diagnostic quality and diagnostic modalities while reducing doses of incident radiation. Though several new detectors have been proposed for digital radiography and computed tomography, there is still no single technology of choice that addresses all of the issues for optimal imaging. The technology of choice depends upon several image quality criteria such as high quantum and energy absorption efficiency, high detector quantum efficiency (DQE), high spatial resolution, negligible scattered acceptance, detector geometry, fast readout, high dynamic range, image correction and display capabilities, and of course, acceptable cost. One of the primary problems with digital radiography is the detection of scattered radiation which reduces the contrast of the image. Known line scanning techniques inefficiently utilize the X-ray tube output. This limitation can be overcome by utilizing a wider slot-shaped X-ray beam and collection of multiple lines simultaneously.

One approach to overcome the aforementioned disadvantages is discussed in the patent application U.S. Ser. No. 60/011,499, which is incorporated herein by reference. The approach disclosed therein provides a dual-energy gas microstrip wherein low energy and high energy images are obtained and are compared to provide a high contrast image. Although this approach is effective, it only employs a single medium, the gas surrounding the microstrip, to develop the dual image. Through further research, new devices have been developed which further improve these detection techniques.

DISCLOSURE OF INVENTION

In light of the foregoing, it is a first aspect of the present invention to provide a multi-density and multi-atomic number detector media for applications such as, but not limited to, imaging, dosimetry, and radiation monitoring and combinations thereof.

Another aspect of the present invention is to provide an ionization device or source to project ionizing radiation (X-rays, gamma rays, fast particles, neutrons) of any energy range for any application through an object whereupon the rays are received by a multi-detector.

A further aspect of the present invention, as set forth above, is to provide the multi-detector in a single energy or a dual energy configuration, wherein a single energy spectrum is analyzed by two different media, and wherein the dual energy detector receives a bimodal energy spectrum analyzed by two different media. In either case, the energy can be polychromatic or monochromatic. In the case of a polychromatic energy spectrum, the single energy term is used as equivalent to "average" or "effective energy" of the polychromatic spectrum.

Still a further aspect of the present invention, as set forth above, is to generate a high dynamic range image with the multi-detector receiving a single energy radiation pulse.

Yet another aspect of the present invention, as set forth above, is to provide the multi-detector with a low energy detector adjacent to a high energy detector.

Still another aspect of the present invention, as set forth above, is to apply separate electric fields to both low and high energy detectors as the incident radiation is projected therethrough, wherein the low energy detector may either be a gas ionization detector or a semiconductor ionization detector and the high energy detector is the other.

A further aspect of the present invention, as set forth above, is to generate images from the two detectors which are then received by a microprocessor to generate a contrasted image signal for display of the object.

Yet another aspect of the present invention, as set forth above, is to interpose a high pass energy filter between the two detectors to assist in developing the contrasted image signal, wherein a low contrast is obtained through weighted subtraction of the two images, such as for soft tissue.

Yet a further aspect of the present invention, as set forth above, is to provide a mechanism for moving the multi-detector as it receives the ionizing radiation and wherein the electric field applied is adjusted to allow for implementation of kinestatic, or time delay integration techniques, or both.

An additional aspect of the present invention, as set forth above, is to provide a multi-detector wherein the gas ionization detector includes a high voltage plate opposite a substrate with a plurality of interleaved anodes and cathodes and wherein a semiconductor ionization detector includes a bias electrode on one side of a semiconductor substrate opposite a plurality of collection electrodes.

Yet another aspect of the present invention, as set forth above, is to provide a multi-detector in which the incident radiation is first absorbed by a low energy detector with its applied electric field orthogonal to the incident radiation, and wherein the low energy detector is adjacent a high energy detector with its applied electric field orthogonal to the incident radiation.

Yet an additional aspect of the present invention, as set forth above, is to provide a multi-detector in which the incident radiation is first absorbed by a low energy detector with its applied electric field facing directly into the incident radiation, and wherein a high energy detector is adjacent the low energy detector with its applied electric field orthogonal to the incident radiation.

Still an additional aspect of the present invention, as set forth above, is to provide a multi-detector in which the incident radiation is first absorbed by a low energy detector with its applied electric field orthogonal to the incident radiation and whereupon the incident radiation is received by a high energy detector with its applied electric field aligned in the same direction as the incident radiation.

Still another aspect of the present invention, as set forth above, is to provide a multi-detector, in an open beam geometry, in which the incident radiation is first absorbed by a low energy detector and subsequently by a high energy detector, wherein the electric field applied by each detector is aligned with the incident radiation.

Still a further aspect of the present invention, as set forth above, is to provide a multi-detector, in an open beam geometry, in which the incident radiation is first absorbed by a low energy detector and subsequently by a high energy detector, wherein the electric field applied by each detector is aligned with the incident radiation.

Still another aspect of the present invention, as set forth above, is to configure the multi-detector to monitor radiation record dosage levels, generate images, and perform related detector functions.

Still yet another aspect of the present invention, as set forth above, is to configure the adjacent defectors to perform the same or different functions noted above. For example, both detectors could perform imaging functions or, alternatively, one adjacent detector could perform an imaging function as the other adjacent detector performs a radiation monitoring function.

Still a further aspect of the present invention, as set forth above, is that the ionizing radiation may be presented in several particles or different radiations (mixed fields), at different energies which can be measured, monitored or displayed by either one or both of the adjacent detectors upon proper optimization of the system geometries, wherein the detectors perform the same or different functions.

In general, the present invention provides a multi-detector which receives incident ionizing radiation through a subject, comprising a gaseous microstrip detector and a semiconductor detector adjacent the gaseous microstrip detector, wherein electric fields are applied to both the detectors as the incident radiation is directed therethrough, the gaseous microstrip detector and the semiconductor detector generating corresponding signals for observation.

The present invention also provides a method for obtaining an image of a subject exposed to incident radiation comprising the steps of exposing a multi-detector to incident radiation projected through a sample, wherein the multi-detector comprises a first detector adjacent a second detector, generating a first signal from the first detector, generating a second signal from the second detector, and comparing the first and second signals.

BRIEF DESCRIPTION OF THE DRAWINGS

For a complete understanding of the objects, techniques, and structure of the invention, reference should be made to the following detailed description and accompanying drawings wherein.

BEST MODE FOR CARRYING OUT THE INVENTION

Figure 1:
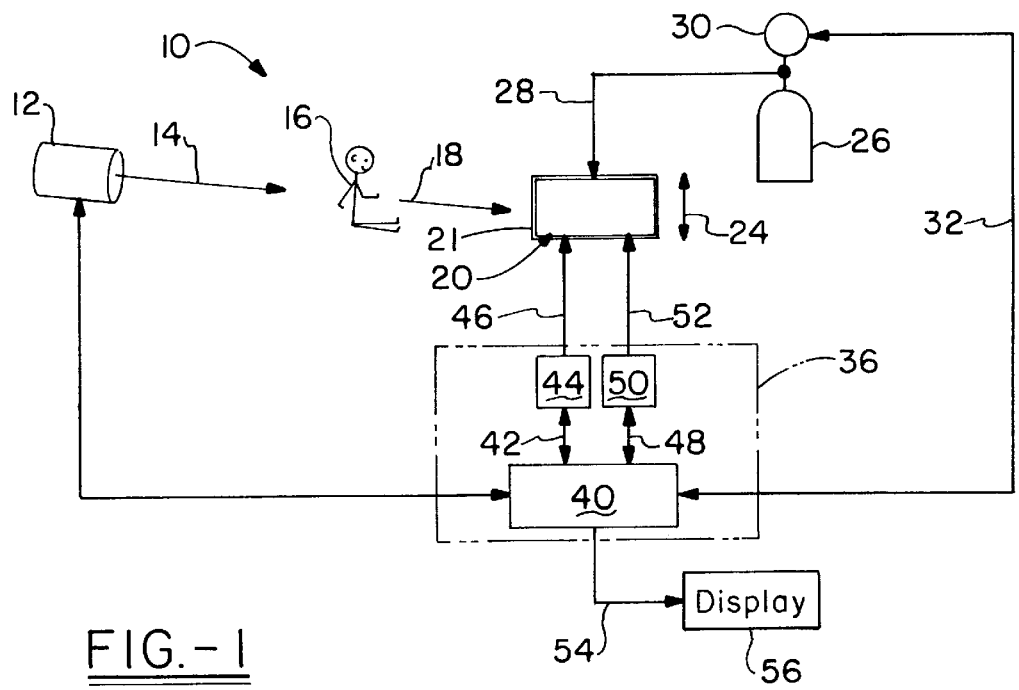
FIG. 1 is a schematic diagram of a multi-density and multi-atomic number detector imaging system.

Referring now to the drawings and more particularly to FIG. 1, it can be seen that a multi-density and multi-atomic number detector imaging system is designated generally by the numeral 10. As will be appreciated by the discussion that follows, the imaging system 10 utilizes a high atomic number or high Z material, which is a high density media, in combination with a low atomic number or low Z material, which is low density media, in order to provide a high contrast single energy or dual-energy imaging system. The system 10 may operate as a slot-scanning beam detector which may be implemented by kinestasis or time delay integration techniques. The system 10 may also be used in an open beam geometry. Alternatively, the imaging system 10 may be used with an Application Specific Integrated Circuit (ASIC) to be operated as a charged couple device camera. Those skilled in the art will appreciate that the imaging system may be used in large field view imaging, or micro-imaging (microscopy) with dual-energy or single-energy capabilities.

The system 10 includes an ionization device or source 12 for generating and directing ionizing radiation 14 through a subject 16. The ionizing radiation may include, but is not limited to, X-rays, gamma rays, fast particles, neutrons, and the like. The radiation may be projected in the form of mixed fields or at different energies and observed by the multi-detector which performs its predetermined functions. It will be appreciated that the ionization device 12 may be configured to generate a polychromatic energy spectrum of mean energy E or a single energy beam generated by a one frequency spectrum synchrotron. Alternatively, the ionization device 12 may be configured to generate a polychromatic bimodal energy spectrum. The subject 16 maybe a person or a biological or pharmaceutical sample through which the radiation passes to generate rays 18 that are received by a multi-density/multi-atomic number multi-detector 20. Typically, the multi-detector 20 is provided in a sealed aluminum enclosure 21 which is movable in a plane orthogonal to the incident image rays 18 in a scanning direction 24. In order to properly obtain an observation of the subject 16, the multi-detector 20 has several components which are connected to the multi-detector 20. As will be appreciated, the "observation" performed by the multi-detector 20 may be for imaging, to monitor radiation, record dosage levels, or perform any known function performed by known ionization detectors. In other words, each detector within the multi-detector 20 may perform different functions or the same function depending upon the desired results and system configuration.

A pressurized gas 26, which may be argon, xenon, krypton, and mixtures thereof, or other noble gases or their mixtures in combination with polar or quenching compounds in a dopant concentration is in fluid communication with the enclosure 21 via a pressure line 28. A pressure meter 30 is attached to the pressurized gas so that the pressure within the enclosure of the multi-detector 20 may be regulated. A pressure signal 32 is generated by the pressure meter 30.

A control system 30 communicates with various components of the system 10 to monitor and control each function thereof. In particular, control system 30 includes a microprocessor 40 which provides the necessary software, hardware, and memory to control operation of the imaging system 10. The processor 40 receives the pressure signal line 32 so that pressure within the multi-detector 20 may be adjusted between low, atmospheric and high pressures depending upon the imaging application.

The processor 40 is connected via a signal line 42 to a detector circuit 44 which is connected to the multi-detector 20 via a signal line 46. Likewise, a signal line 48 connects the processor 40 to a detector circuit 50 which is connected via a signal line 52 to the multi-detector 20. The processor 40 receives information from the detector circuit 44 and the detector circuit 50 and generates a contrasted image signal 54 which is received for display by an image display 56. In all of the embodiments to follow where dual-energy imaging is anticipated, the incident radiation is always first received by the low energy detector. Any radiation that is not absorbed is then received by the high energy detector.

Generally, the multi-detector 20 has two basic components: a gas filled detector volume and a solid state or semiconductor substrate detector volume which are positionally interchangeable. The incident rays 18 dissipate part of their energy in the first detector volume and then dissipate their remaining energy through interaction in the second detector volume producing, in both cases, charge pairs. An applied electric field through both volumes imparts a constant drift velocity to these charge pairs and drives the charges of polarities toward their respective signal collectors. It will be appreciated that the different detector media used in the detectors may be a solid state semiconductor material, a gas, or a liquid that produces signals via direct or indirect ionization, such as by scintillation, in any geometry, or combination thereof.

For purposes of a single energy multi-detector, the proposed technology utilizes multidensity and multi-atomic number detector media. High Z (atomic number), high density media in combination with low Z, low density media is believed to offer high contrast and high specificity. For instance, a better contrast C may result due to the different attenuation coefficients of the two media, $\mu_1$, $\mu_2$:

$$C = \frac{\mu_2 - \mu_1}{1/2(\mu_1 + \mu_2)} \quad (1)$$

where in general:

$$\mu(\rho_e, Z, E) = \mu_c(\rho_e, E) + \mu_p(\rho_e, Z, E) \quad (2)$$

In the above equations, $\rho_e$ is the electron density of the material, Z is the effective atomic number, and E is the photon energy, and the subscripts c and p, indicate Compton and photoelectric interactions, respectively. Subtraction techniques of the two images can be utilized to enhance the image contrast and dynamic range in single energy imaging.

For a dual energy multi-detector, logarithmic extractions may be applied to the signals generated by each media whereupon the difference between the two signals generates the desired image. Additional imaging scenarios may be obtained by changing the orientations of the electric field applied to the low and high energy detectors so as to achieve the desired image contrast and spatial resolution, or other functional result.

Figure 2:
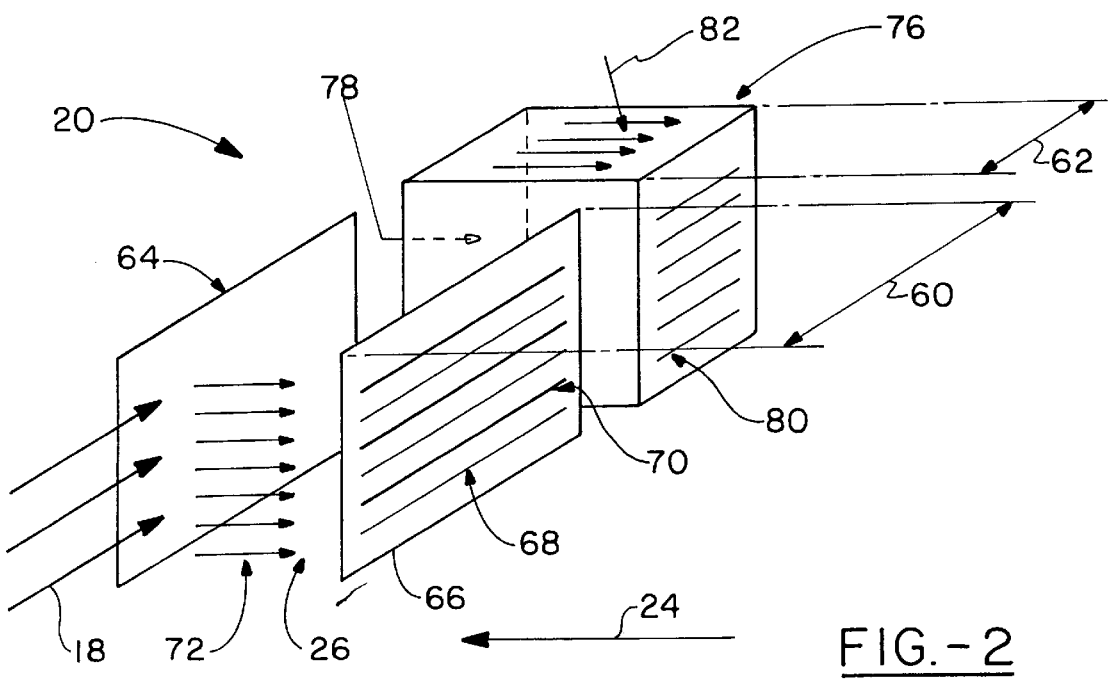
FIG. 2 is a schematic diagram of a preferred detector employed in the imaging system.

Referring now to FIG. 2, one preferred embodiment of the multi-detector 20 is presented. In particular, the multi-detector 20 includes a gas ionization detector 60 and a semiconductor ionization detector 62 for a dual-energy imaging embodiment. In a single energy imaging embodiment, the detector 60 is the first detector to receive the incident radiation and the detector 62 is the second detector.

The gas ionization detector 60 includes a high voltage plate 64 opposite a substrate 66. The substrate 66 may be a conductive glass or plastic substrate with suitable electrical conduction properties. The substrate 66 may be provided with an electrically conductive layer on the surface of an insulator by means of ion implantation or deposition of a thin film of semiconductor material. A plurality of insulated microstrip anodes 68 are interleaved with a like plurality of insulated microstrip cathodes 70. Accordingly, an electric field 72 is generated between the high voltage plate 64 and the substrate 66. The high voltage plate 64, the substrate 66, the anodes 68 and the cathodes 70 are connected to the energy detection circuit 44 via the signal line 46.

The semiconductor ionization detector 62 includes a substantially cube-shaped semiconductor material 76 with a bias electrode 78 disposed on one surface of the cube while a plurality of collection electrodes 80 are disposed on an opposing surface. Accordingly, an electric field 82 is generated between the bias electrode 78 and the collection electrodes 82. Both the bias electrode 78 and the collection electrodes 80 are connected to the detection circuit 50 via a signal line 52.

In all embodiments of the present invention, the detection components of the energy detectors, such as the anodes 68, the cathodes 70, the collection electrodes 80, and even the low and high energy detection circuits 44 and 50 may be incorporated on an integrated circuit contained within the enclosure 21. The integrated circuit would provide all the integrated active and passive signal conditioning and related circuits to generate a digital output received by the processor 40.

In FIG. 2, the detector 60 employs a high-pressure gas environment to provide the advantage of a high primary quantum-detection efficiency together with an efficient conversion into charge carriers. As the gas pressure is increased, the amount of incident photons which interact with the gas increases, therefore increasing the quantum efficiency.

Additionally, the amount of photon energy deposited in the gas per interacting photon increases. At high pressures, a large number of electrons and fluorescence is stopped in the gas and thus, the sensitivity is determined by the energy carried by the resulting gamma photons. Therefore, a high pressure gas-filled ionization detector, operating in a saturation regime, offers many advantages.

In the preferred embodiment, it appears that the gas of choice is xenon because of its high X-ray stopping power. However, krypton may provide an advantage since it has less emitted and re-absorbed fluorescence and allows the interactions to spread out from where the incident radiation impinges on the enclosure 21 while restricting the ranges of the emitted photo electrons and Compton electrons, thereby improving spatial resolution.

The response of a high-pressure gas-filled detector 60 may be greatly improved by moving the enclosure 21 in a kinestatic charged detection mode wherein the ion speed is adjusted, by adjusting the applied electric field, so that the ion speed is equal and opposite to the scan speed 24 of the multi-detector 20. Thus, at any instant in time, 50–1,000 lines of image data are integrated simultaneously, depending upon the scan speed and sampling rate. However, only one line of collector electrodes is needed to read out the fully-integrated image data.

An improvement of the multi-detector 20 and imaging parameters are obtained by utilizing the microstrip substrate 66 as a collector. Thus, by applying the anodes 68 and cathodes 70 with photolithographic techniques, high gain uniformity over large areas is attainable. Accordingly, as the incident radiation is directed through the multi-detector 20, the primary electrons produced by direct gamma-ray ionization of the gas medium are directed toward the anodes 68. When the electrons reach the electric field between the anodes and cathodes 68 and 70, the electrons drift toward the cathodes 70 and experience an avalanche amplification at sufficiently high field strength, due to the quasi-dipole anode-cathode configuration.

In the present embodiment, the multi-detector 20 utilizing a high operating gas pressure has been chosen as a compromise between high quantum detective efficiency and reduced electron range, and adequate gain. Advantages of the gas-microstrip substrate for the detector 60 include high spatial and contrast resolution, resulting from the fine collector size, high gas pressure, and high gain. Further advantages of utilizing the low energy detector in the present invention are that a high gain is achieved with a low applied voltage, due to the high local electric fields generated near the anodes. A further advantage is that large signals are produced due to the high gain and high quantum efficiency. Yet another advantage is that an extremely small signal collection time is needed due to the small anode cathode separation, high drift velocity caused by the high electric fields, and a small value of microstrip capacitance which thereby eliminates space-charge effects. Still another advantage is that a high mechanical stability low cost detector is provided.

In FIG. 2, the detector 62 receives the image rays 18 which are not affected by the detector 60 and are impinged upon the semi-conductor material 76. Accordingly, the detector 62 is optimally used for digital radiography because of the direct conversion of x-rays to electrical signals. For example, $Cd_{1-x}Zn_xTe$ is one potential semiconductor material for medical and industrial imaging applications because it has a high stopping power due to its high mass of density (5.8 $g/cm_3$) and an effective atomic number Z of 49.6 ($Cd_{0.9}$:48, $Zn_{0.1}$:30, Te:52). This allows for a decreased detector thickness and consequently, good spatial resolution. Other potential semi-conductor materials are a-Se, a-Si, CdTe and the like which provide a high atomic number and high density. The primary advantages of such a semiconductor ionization detector, as embodied in the multi-detector 20, is evident by its efficient radiation absorption, good linearity, high stability, high sensitivity and wide dynamic range. Significant progress has been achieved in the growth of high quality $Cd_{1-x}Zn_xTe$ semiconductor crystals using a High Pressure Bridgman technique. Specifically, by alloying CdTe with Zn, the bulk resistivity of this semiconductor is approximately $10^{11}$ Ω-cm. This high resistivity is due to the wide band gap of the ternary semiconductor which results in low leakage currents and consequently, low noise characteristics. The imaging potential of the solid state detector can be improved if a time-delay integration technique is utilized. In this technique, the semiconductor material is organized into an array of pixels consisting of N columns and M rows. The speed with which the collective charge is transferred along the columns is synchronized with the speed with which the detector is scanned or translated parallel to the image plane. As a result, the collected charge, corresponding to one portion of the observed subject, is integrated during image acquisition providing a larger signal than that collected in any individual pixel.

Once the rays 18 have passed through the detector 60 and the detector 62, corresponding signals 46 and 52 are generated and received by the detection circuit 44 and the detection circuit 50, respectively. Each circuit 44 and 50 controls application of the respective electric fields and monitors the collected signals and if required, performs signal filtering and processing as known in the art. For example, the high voltage plate 64 and the substrate 66 are connected to the circuit 44 to control application of the electric field 72, while the anodes 68 and the cathodes 70 are connected to the circuit 44 to monitor the low energy absorption of the ionized gas medium. Likewise, the bias electrode 78 and the collection electrodes 80 are connected to the circuit 50 to control application of the electric filed 82 and to monitor the energy absorption of the semiconductor substrate. The circuits 44 and 50 then pass corresponding signals 42 and 48 to processor 40, which in turn generates the contrasted signal 54.

In the alternative embodiments to follow, the positioning of the multi-media detectors may be interchanged along with the orientation of their respective electric fields. In any event, the gas ionization detector is always associated with detection circuit 44 and the semiconductor ionization detector is always associated with detection circuit 50.

Figure 3:
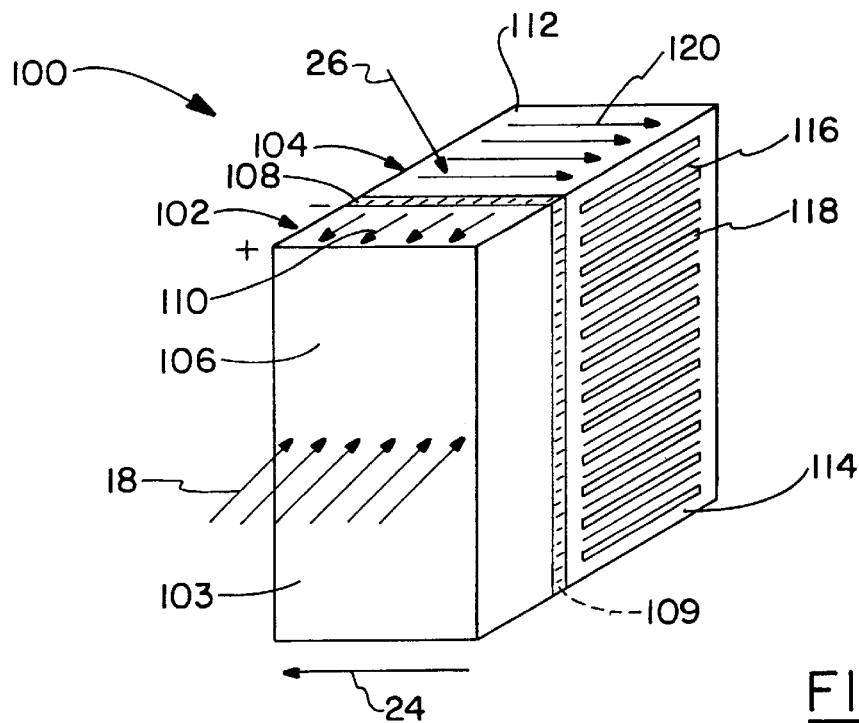
FIG. 3 is a first alternative embodiment of a detector employed in the imaging system.

Referring now to FIG. 3, it can be seen that an alternative multi-detector is generally designated by the numeral 100. The multi-detector 100, which is received in the enclosure 21, provides a first or low energy detector 102, which is a gas ionization detector, adjacent a second or high energy detector 104 in the form of a semiconductor ionization detector. In this embodiment, the rays 18 are first impinged upon the detector 102 which employs a semiconductor substrate 103. The detector 102 provides a bias electrode 106 on one side of the substrate 103 which directly faces the rays 18 while the opposite side of the substrate 103 provides a pixel array detector 108 made up of a plurality of pixels 109. Accordingly, an electric field 110 is generated across the substrate 103 and is oriented in a direction opposite the rays 18. In a dual energy embodiment, the low energy of the rays 18 are first absorbed in the substrate 103 and any energy that is not absorbed thereby is directed to the detector 104. The detector 104 includes a high voltage plate 112 opposite a substrate 114. As in the prior embodiment, a plurality of microstrip anodes 116 are interleaved with a plurality of microstrip cathodes 118. Accordingly, an electric field 120 is orthogonal to the rays 18 and opposite the scan direction 24. The images generated by the detector 102 and the detector 104 are then transferred to their corresponding circuits 44 and 50 for processing by the processor 40 which in turn generates a contrasted image signal 54. As is in the previous embodiment, the electrical leads and components associated with the detectors 104 and 102 are connected to their respective detection circuits which are in turn connected to the processor 40.

Figure 4:
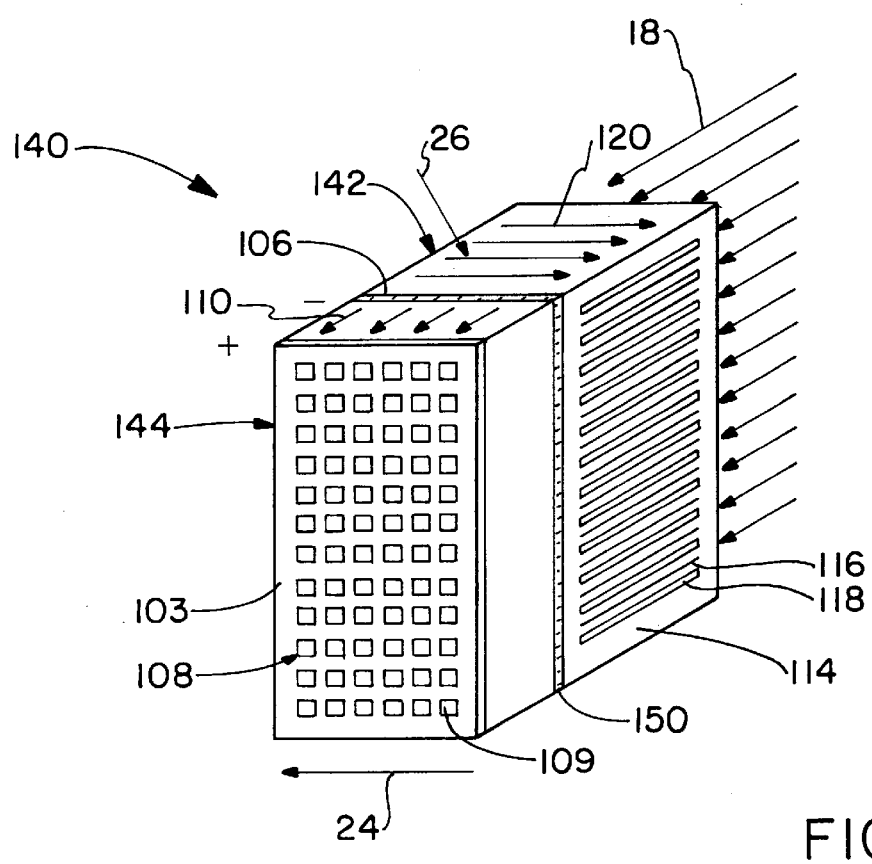
FIG. 4 is a second alternative embodiment of a detector employed in the imaging system.

In an alternative embodiment, as presented in FIG. 4, an alternative multi-detector is generally designated by the numeral 140. In this embodiment, the rays 18 first impinge upon a gas ionization detector 142 with its electric field is orthogonal thereto. Next, the rays 18 are received by a semiconductor ionization detector 144 adjacent to the detector 142. In this variation, however, the bias electrode 106 is adjacent the detector 142 with the pixel array detector 108 being opposed thereby. Otherwise, all the structural features of this embodiment are the same as that of the detector of the previous embodiment. Therefore, the electric field 110 is oriented in the same direction as the impinging rays, the signals are then collected and generated as in the previous embodiments.

If desired, both of the multi-detectors 100 and 140 may be provided with a high pass energy filter 150 disposed between the detectors.

In FIG. 4, the high pass energy filter 150 is placed in front of the semiconductor substrate 103 and behind the detector 142 for the purpose of removing low frequency components of the incident radiation. Accordingly, high energy images are generated by the semiconductor material 103. Low plus high energy images are generated by the detector 142. A logarithmic subtraction of the two images, the low energy image less the high energy image, generates a low energy image suitable for soft issue or low density imaging.

In FIG. 3, the high pass energy filter 150 may be placed in front of the detector 104 and behind the detector 102. This arrangement is also beneficial for obtaining high contrast images from the difference between the detectors.

Figure 5:
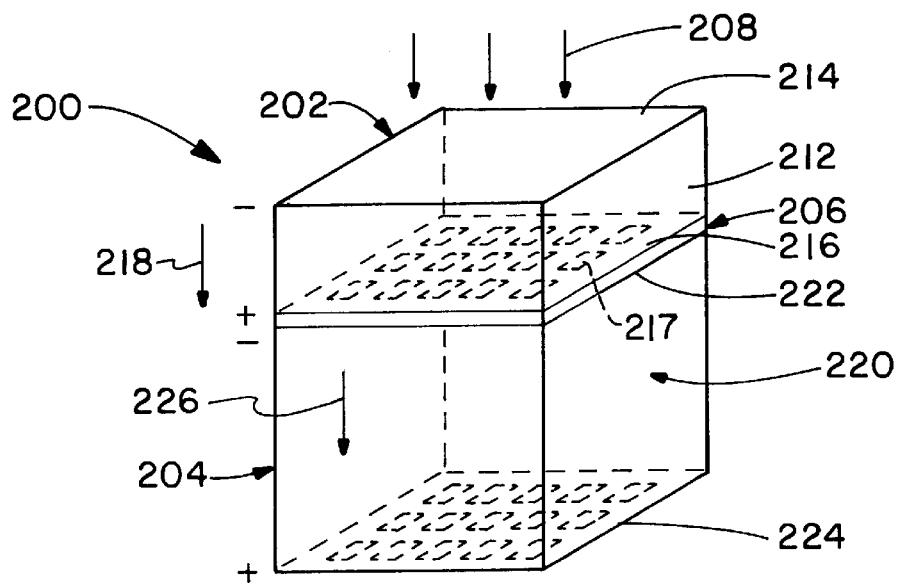
FIG. 5 is a schematic diagram of a detector employed in an open beam geometry.

Referring now to FIG. 5, it can be seen that a multi-detector employed in an open-beam geometry system is designated generally by the numeral 200. The multi-detector 200 is quite similar to the previous detectors, except that it is used in an open-beam geometry instead of a scanning beam geometry. The multi-detector 200 includes a multi-detector 202 adjacent a multi-detector 204. As in the previous embodiments, a high pass energy filter 206 may be disposed between the detectors. In this embodiment, incident radiation in the form of rays 208 are directed first at the multi-detector 202.

As in the previous embodiments, the semiconductor ionization multi-detector 202 includes a semiconductor substrate 212 which has a bias electrode 214 disposed on one surface of the substrate 212 opposite a collection electrode 216 or an array of pixels 217. Accordingly, an electric field 218 is generated between the bias electrode 214 and the collection electrode 216 and is aligned with and oriented in the same direction as the incident image rays 118. Application of the electric field 218 causes direct or indirect ionization of the semiconductor material to generate an image. The bias electrode 214 and collection electrode 216 are connected to the detection circuit 44 as in the previous embodiments. Of course, the controlling circuitry may be disposed within the enclosure 21 for more efficient processing of the electrical signals.

The gas ionization multi-detector 204 is provided within a gas medium 220 as discussed in the previous embodiments. A high voltage mesh 222 is positioned opposite a microstrip substrate or pixelized detector 224 for the purpose of generating an electric field 226 which is aligned with and oriented in the same direction as the incident image rays 118. Accordingly, the electric field 226 causes charged coupled pairs resulting from the ionization of the gas medium 222 to accelerate toward the substrate or detector 224. As in the previous embodiments, the high voltage mesh 222 and the microstrip substrate or detector 224 are connected to the detector circuit 50 for processing of an energy signal.

Figure 6:
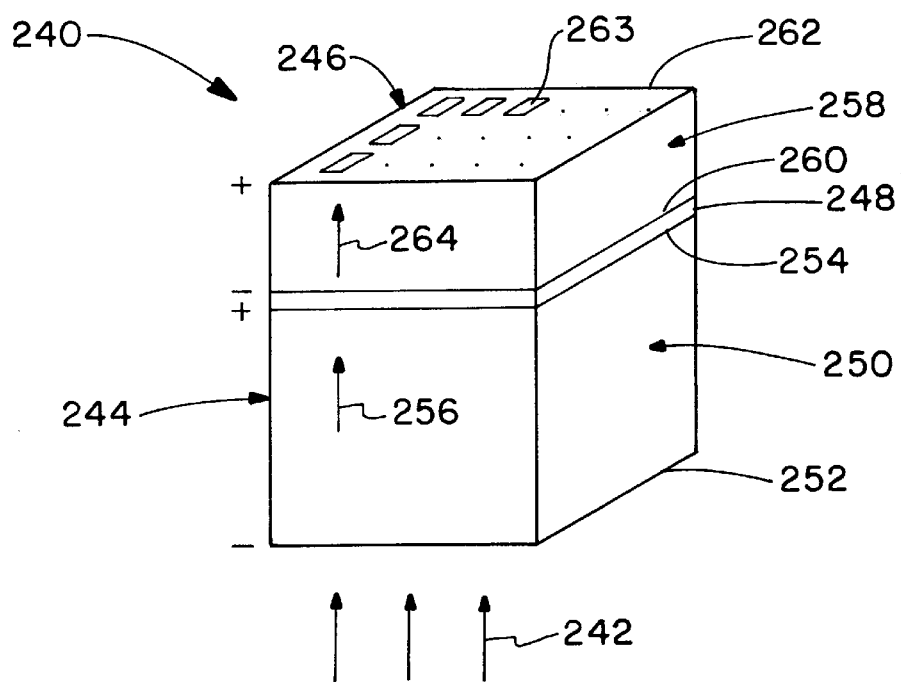
FIG. 6 is a schematic diagram of an alternative detector employed in an open beam geometry.

Referring now to FIG. 6, an alternative open beam geometry detector is designated generally by the numeral 240. This embodiment is much like that shown in FIG. 5 except that the incident radiation in the form of rays 242 are directed first at a gas ionization detector 244 and then to a semiconductor ionization detector 246. As in the previous embodiments, a high pass energy filter 248 may be provided between the detectors 244 and 246.

In this embodiment, the detector 244 is provided within a gas medium 250. A high voltage plate 252 is disposed orthogonally in relation to the rays 242 at one end of the detector 244 while a microstrip substrate or pixelized detector 254 (pixels not shown) is disposed at the opposite end of the detector 244. Accordingly, an electric field 256 is generated therebetween and is aligned with the rays 242. The high voltage plate 252 and the microstrip pixelized detector 254 are connected to the detector circuit 44 for processing of a signal.

Adjacent the detector 244 is the detector 246 which includes a semiconductor substrate 258. A bias electrode 260 is disposed on one surface of the substrate 258 orthogonal to the rays 242. Disposed on a surface opposite the bias electrode 260 on the substrate 258 is a collection electrode 262 which may be in the form of an array of pixels 263. Accordingly, an electric field 264 is generated between the bias electrode 260 and the collection electrode 262 that is aligned with the rays 242. The bias electrode 260 and the collection electrodes 262 and/or the pixels 263 are connected to the detector circuit 50 for processing of a corresponding signal.

In the open beam geometry provided in FIGS. 5 and 6 a contrasted image signal can be generated as in the previous embodiments for better sensitivity.

From the foregoing discussion, it will be appreciated that the system 10 with the multi-detectors 20, 100, 140, 200 and 240 combine the high energy absorption efficiency of the solid ionization detectors, with the high spatial resolution resulting from the fine microstrip collector size and its high gain provided by the low energy detectors. As a result, good spatial and contrast resolution, at a low radiation dose, is provided. Additionally, the system 10 allows freedom to design and optimize a dual-energy system. All of the detectors disclosed herein may operate in a scanning slot beam or open beam geometry. These detectors may also operate as large area detectors. Kinestatic principles are utilized in generating the imaging signals by the low energy detectors, while the high energy detector employ time-delay integration techniques to generate the corresponding observation signals for the scanning slot beam geometries.

Thus, it can be seen that the objects of the invention have been attained by the structure and methods presented above. While in accordance with the patent statutes, only the best mode and preferred embodiment of the invention has been described in detail, the invention is not limited thereto or thereby. Accordingly, for an appreciation of the true scope and breadth of the invention, reference should be made to the following claims.

What is claimed is:

1. A multi-detector which receives direct incident ionizing radiation through a subject, comprising:
   a gaseous microstrip detector; and
   a semiconductor detector different from and positioned adjacent said gaseous microstrip detector;
   wherein electric fields are applied to both said detectors as the direct incident radiation is directed therethrough, said gaseous microstrip detector and said semiconductor detector generating corresponding signals for observation.

2. The multi-detector according to claim 1, further comprising:
   a sealed enclosure for receiving said detectors; and
   a control system connected to each said detector, wherein said control system controls application of said electric fields and monitors said signals.

3. The multi-detector according to claim 2, wherein said control system comprises:
   a first detection circuit connected to one of said detectors for controlling application of the electric field thereto and generating a first signal;
   a second detection circuit connected to the other of said detectors for controlling application of the electric field thereto and generating a second signal; and
   a processor for receiving said first and second signals and generating said contrasted signal which is received by a display.

4. The multi-detector according to claim 3 further comprising:
   means for moving said sealed enclosure in a plane orthogonal to the incident ionizing radiation.

5. The multi-detector according to claim 3, wherein said sealed enclosure receives a gas, said gaseous microstrip detector comprising a high voltage plate opposite a substrate wherein said substrate has alternating anodes and cathodes, wherein application of the electric field between said substrate and said high voltage plate generates said first signal as said incident radiation is received;
   said semiconductor detector comprising a semiconductor material having a bias electrode on one surface and a collection electrode on an opposite surface, wherein application of the electric field between said bias and collection electrodes generates said second signal as said incident radiation is received; and
   wherein said gaseous microstrip detector first receives the incident radiation and both of the electric fields are orthogonal to the incident radiation.

6. The multi-detector according to claim 3, wherein said sealed enclosure receives a gas, said gaseous microstrip detector comprising a high voltage plate opposite a substrate wherein said substrate has alternating anodes and cathodes, wherein application of the electric field between said substrate and said high voltage plate generates said second signal as said incident radiation is received;
   said semiconductor detector comprising a semiconductor material having a bias electrode on one surface and a collection electrode on an opposite surface, wherein application of the electric field between said bias and collection electrodes generates said first signal as said incident radiation is received; and
   wherein said semiconductor detector first receives the incident radiation, and the electric field in the semiconductor detector is opposite the incident radiation and the electric field in the gaseous microstrip detector is orthogonal to the incident radiation.

7. The multi-detector according to claim 3, wherein said sealed enclosure receives a gas, said gaseous microstrip detector comprising a high voltage plate opposite a substrate wherein said substrate has alternating anodes and cathodes, wherein application of the electric field between said substrate and said high voltage plate generates said first signal as said incident radiation is received;
   said semiconductor detector comprising a semiconductor material having a bias electrode on one surface and a collection electrode on an opposite surface, wherein application of the electric field between said bias and collection electrodes generates said second signal as said incident ionizing radiation is received; and
   wherein said gaseous microstrip detector first receives the incident radiation, and the electric field in the semiconductor detector is aligned with the incident radiation and the electric field in the gaseous microstrip detector is orthogonal to the incident radiation.

8. The multi-detector according to claim 3, wherein said sealed enclosure receives a gas, said gaseous microstrip detector comprising a high voltage source opposite a collection device, wherein application of the electric field between said high voltage source and the collection device generates said second signal as said incident radiation is received;
   said semiconductor detector comprising a semiconductor material having a bias electrode on one surface and a collection electrode on an opposite surface, wherein application of the electric field between said bias and collection electrodes generates said first signal as said incident radiation is received; and
   wherein said semiconductor detector first receives the incident radiation and the electric fields in the semiconductor detector and the gaseous microstrip detector are aligned with the incident radiation.

9. The multi-detector according to claim 3, wherein said sealed enclosure receives a gas, said gaseous microstrip detector comprising a high voltage source opposite a collection device, wherein application of the electric field between said high voltage source and the collection device generates said first signal as said incident radiation is received;
   said semiconductor detector comprising a semiconductor material having a bias electrode on one surface and a collection electrode on an opposite surface, wherein application of the electric field between said bias and collection electrodes generates said second signal as said incident radiation is received; and
   wherein said gaseous microstrip detector first receives the incident radiation and the electric fields in the semiconductor detector and the gaseous microstrip detector are aligned with the incident radiation.

10. The multi-detector according to claim 3, wherein said first and second signals may each be selectively employed for imaging, radiation monitoring and radiation measuring.

11. A method for obtaining an image of a subject exposed to incident radiation comprising the steps of:
    exposing a multi-detector to direct incident radiation projected through a sample, wherein said multi-detector comprises a first detector different from and adjacent a second detector and wherein said first detector is a gaseous microstrip detector and said second detector is a semiconductor detector;

generating a first signal from said first detector;

generating a second signal from said second detector; and comparing said first and second signals.

12. The method according to claim 11, further comprising the steps of:

enclosing said multi-detector in a gas-filled enclosure;

applying respective electric fields to said first detector and said second detector, wherein the gas is ionized by the incident radiation within one of said first and second detectors and the other of said first and second detectors is a semiconductor material that is ionized by the incident radiation for respectively generating said first and second signals.

13. The method according to claim 12, further comprising the step of:

scanning said multi-detector in a plane orthogonal the incident radiation;

wherein the electric field applied to one of said first and second detectors is adjusted so that the ion speed is substantially equal and opposite to the scanning speed of said multi-detector.

14. The method according to claim 12, further comprising the step of:

scanning said multi-detector in a plane orthogonal the incident radiation;

wherein the electric field applied to one of said detectors generates a collective charge on a surface of said semiconductor material arrayed in rows and columns, wherein the speed with which the collective charge is transferred along one of said rows and said columns is synchronized with the scanning speed of said detector.

15. The method according to claim 12, further comprising the steps of:

orienting said gas ionized detector to receive the incident radiation first; and orienting the electric fields generated by said gas ionized detector and said semiconductor ionized detector in a plane orthogonal to the incident radiation.

16. The method according to claim 12, further comprising the steps of:

orienting said semiconductor ionized detector to receive the incident radiation first;

orienting the electric field generated by said semiconductor ionized detector in a direction opposite the incident radiation; and orienting the electric field generated by said gas ionized detector in a plane orthogonal to the incident radiation.

17. The method according to claim 12, further comprising the steps of:

orienting said gas ionized detector to receive the incident radiation first;

orienting the electric field generated by said gas ionized detector in a plane orthogonal to the incident radiation; and orienting the electric field generated by said semiconductor ionized detector in a direction aligned with the incident radiation.

18. The method according to claim 12, further comprising the steps of:

orienting said semiconductor ionized detector to receive the incident radiation first;

orienting the electric fields generated by said gas ionized and semiconductor ionized detectors in the same direction as the incident radiation.

19. The method according to claim 12, further comprising the steps of:

orienting said gas ionized detector to receive the incident radiation first;

orienting the electric fields generated by said gas ionized and semiconductor ionized detectors in the same direction as the incident radiation.

20. The method according to claim 12, further comprising the steps of:

selectively utilizing said first and second signals for imaging, radiation monitoring and radiation measuring.

* * * * *